| United States Patent [19] | [11] Patent Number: 4,560,271 |
| Fumio | [45] Date of Patent: Dec. 24, 1985 |

[54] OPTICAL DISTANCE-MEASURING METHOD AND APPARATUS THEREFOR

[75] Inventor: Ohtomo Fumio, Tokyo, Japan

[73] Assignee: Tokyo Kogaku Kikai Kabushiki Kaisha, Tokyo, Japan

[21] Appl. No.: 482,138

[22] Filed: Apr. 5, 1983

[30] Foreign Application Priority Data

Apr. 8, 1982 [JP] Japan ................................. 57-58620

[51] Int. Cl.⁴ .............................................. G01C 3/08
[52] U.S. Cl. ............................................ 356/5; 356/4
[58] Field of Search ....................................... 356/4, 5

[56] References Cited

U.S. PATENT DOCUMENTS

| 3,551,050 | 12/1970 | Thorlin ................................. 356/4 |
| 3,561,869 | 2/1971 | Cason, III et al. .................... 356/5 |
| 3,968,362 | 7/1976 | Mocker ................................. 356/4 |
| 4,041,490 | 8/1977 | Watt .................................. 343/17.7 |
| 4,229,102 | 10/1980 | Wiklund et al. ....................... 356/5 |
| 4,375,332 | 3/1983 | Yokota et al. ......................... 356/4 |

FOREIGN PATENT DOCUMENTS

0035755 9/1981 European Pat. Off. .
5826683 8/1956 Japan .
2066015A 7/1981 United Kingdom .

*Primary Examiner*—S. C. Buczinski
*Assistant Examiner*—Linda J. Wallace
*Attorney, Agent, or Firm*—Brumbaugh, Graves, Donohue & Raymond

[57] ABSTRACT

In an optical distance-measuring apparatus wherein the light modulated with the constant frequency $f_o$ is emitted through an oscillator OSC, an amplifier SA and a light emitting diode LED and is returned by a reflecting prism DP located on the point the distance to which is being measured, and the distance is measured by the phase difference between the emitted light and returned light, a phase control circuit PCC is provided between the oscillator OSC and the amplifier SA for sequentially inverting the phase of the emitted light A. The real phase difference $\psi A$ is obtained by averaging the phase difference $\psi A$ of the normal light A and the phase difference $\psi A_2$ of the inverted light $\overline{A}$. The averaging operation cancels the error component $\delta_1$ due to the electrical or optical signal leakage in the light transmitting system.

16 Claims, 10 Drawing Figures

OPTICAL DISTANCE-MEASURING METHOD AND APPARATUS THEREFOR

BACKGROUND OF THE INVENTION

1. Field of the Invention

This invention relates to an optical distance-measuring apparatus and more particularly to a method and apparatus for eliminating leakage signals which may reduce the measurement accuracy.

2. Description of the Prior Art

An optical distance-measuring apparatus emits a distance-measuring light from its body and receives the distance-measuring light reflected from a corner cube, for example, which is installed at a point whose distance is to be measured and the distance to that point is measured accurately by the phase difference between the emitted light and the received light. For this purpose a light-emitting element consisting of a light-emitting diode or a laser diode is provided in the body of the optical distance-measuring apparatus, and this light-emitting element generates optical waves modulated through an electric circuit of a transmitting system and projects them onto a reflector installed at the measurement point through a mirror and an objective lens. The optical waves reflected by the reflector are received by a light-receiving element consisting of a photodiode through the objective lens and a second mirror, and its signal is subjected to a given processing in an electric circuit of a receiving system.

The optical path from the light-emitting element to the light-receiving element through the mirror, objective lens, reflector, objective lens and second mirror constitutes an external distance-measuring optical path contributing directly to the distance measurement. On the other hand, an internal reference optical path aimed directly at the light-receiving element from the light-emitting element via another mirror is formed within the body. Since response delays and temperature drift in the various electric circuits constituting the optical distance-measuring apparatus are capable of influencing the phase difference measurement which is essential for data on the distance measurement, the internal reference optical path is designed to eliminate these influences of the electric circuits. The phase difference between the modulated waves from the transmitting system and the modulated waves received by the receiving system is subjected to an arithmetic operation in a processing circuit and is displayed as measured distance data. The external distance-measuring optical path and the internal distance-measuring optical path are interrupted by a chopper. The optical path interruption chopper used hitherto for this purpose consists of an opening forming an internal reference domain for selecting the internal reference optical path and a peripheral notch forming an external distance-measuring domain for selecting the external distance-measuring optical path, and is so constituted that it selects either of the optical paths by rotating round its center to present the external distance-measuring domain and the internal reference domain from the light-emitting element alternately. Both the external distance-measuring optical path and internal reference optical path are necessary for the distance measurement, they are called "normal optical path" hereinafter.

In the optical distance-measuring apparatus, electric leakage signals caused by electric fields, magnetic fields, electromagnetic waves, etc., may also exert a large influence on the distance-measuring precision in the electric circuit comprising the transmitting system, receiving system, precessing circuit, etc., which constitute the apparatus.

There are also leakage optical paths in the optical distance-measuring apparatus reflecting from the optical path interruption chopper, bearing mountings of the optical parts, internal walls of the apparatus, etc., and reaching the light-receiving element, and leakage optical paths reflecting from the optical parts themselves and reaching the light receiving element other than by the above normal optical path.

In the receiving system, a leakage signal $S_l$ in which the above optical leakage signals and electrical leakage signals are combined is given by:

$$S_l = l \sin(\omega t + \psi_l) \quad (1)$$

where
- l: amplitude
- $\psi_l$: phase
- $\omega$: $\omega = 2\pi f$ (f being the modulation frequency)
- t: time.

On the other hand, a normal signal $S_d$ coming from the normal signal system uninfluenced by the leakage signal by way of the normal optical path which is the external distance-measuring optical path or the internal reference optical path is given by:

$$S_d = d \sin(\omega t + \psi_d) \quad (2)$$

where
- d: amplitude
- $\psi_d$: phase
- $\omega$, t: same as in equation (1).

Therefore, the actual signal obtained by the receiving system during the distance measurement is a composite signal $S_h$ of the leakage signal $S_l$ and the normal signal $S_d$ combined. If the composite signal $S_h$ has the relationship $\psi_l = \psi_d + \Delta\psi$ between the phase $\psi_l$ of the leakage signal and the phase of the normal signal, then $$S_h = h \sin(\omega t + \psi_d + \psi_h) \quad (3)$$

where $$h = \sqrt{d^2 + l^2 + 2dl \cos\Delta\psi}$$

and $$\psi_h = \tan^{-1} \frac{l \sin\Delta\psi}{d + l \cos\Delta\psi}$$

The above h indicates the amplitude of the composite signal $S_h$, and $\psi_h$ indicates the phase increment due to the leakage signal in the composite signal $S_h$. In an optical distance-measuring apparatus obtaining a distance through the result of a phase measurement, the presence of $\psi_h$ leads directly to an error.

Usually the strength of the leakage signal $S_l$ is very small when compared with the normal signal $S_d$ so that the condition $d \gg l$ can be set between the amplitude d of the normal signal $S_d$ and the amplitude l of the leakage signal $S_l$. Therefore, h, $\psi_h$ in the above equation (3) are given by:

$$\left.\begin{array}{l} h \approx d \\ \psi_h \approx \dfrac{l}{d} \cdot \sin \Delta\psi \\ = \dfrac{l}{d} \cdot \sin(\psi_l - \psi_d) \end{array}\right\} \quad (4)$$

$\psi_d$ will vary from 0 to $2\pi$(rad) according to the distance being measured. Therefore, as will be apparent from $\psi_h$ of equation (4), the measurement error varies as a sine function of the distance being measured. The error is a maximum at $l/d$ (rad), therefore when it is converted into a distance, the error in the measured distance $\theta_l$ is $$\theta_l = \dfrac{\lambda \cdot l}{4\pi d} \quad (5)$$

where $\lambda$: modulated wavelength.

When, for example, a modulated wave of 15 MHz ($\lambda = 20$ m) is used and the amplitude ratio $l/d$ of the leakage signal to the normal signal is assumed to be 1/200, $\theta_l \approx 8$ mm and the error expressed as a sine function has a maximum of $+8$ mm and a minimum of $-8$ mm.

In an optical distance-measuring apparatus which is required to measure a distance of several kilometers accurately to millimeter units, it may be understood that the presence of a leakage signal will be serious enough to bring about a large error in the result of the distance measurement.

In a conventional type of optical distance-measuring apparatus, the following measures have been taken to prevent such a leakage signal from occurring. First, to prevent the leakage optical paths which generate optical leakage signals, a diffusion surface treatment is applied to the optical path interruption chopper, the bearing mountings of the optical parts, or the internal walls of the apparatus, or shading plate are provided at all the necessary spots, though a satisfactory effect has not been obtained thereby.

The space necessary for mounting the shading plate etc., must be provided, which increases the size of the optical distance-measuring apparatus.

To prevent electrical leakage signals, the transmitting side and the receiving side are isolated by a shield, and to prevent leakage from the power line a filter or the like is used. In particular, the electromagnetic waves generated by the power amplifier driving the light-emitting element is extraordinarily influential when compared with the other circuits, and the preamplifier amplifying minute signals from the light-receiving element is most sensitive to a leakage signal, so that the power amplifier and the preamplifier are each sealed independently from the shielding structure, single or dual as occasion demands, though the effects are yet unsatisfactory. Furthermore, these shading plate and shielding structure have the drawback in that they necessitate an increase in the number of parts and construction steps, and eventually increase the price of the apparatus. Since the optical distance-measuring apparatus is intended for outdoor surveys, the apparatus itself must be portable, small and lightweight, however the above shielding structure and multitude of dousers that must be incorporated are contrary to the requirements of small size and light weight for the apparatus.

SUMMARY OF THE INVENTION

This invention has been designed to solve the above shortcomings unavoidable with the conventional type of optical distance-measuring apparatus, and its first object is to provide a method and apparatus for measuring optical distances whereby the influences exterted on a distance-measuring signal by leakage signals are eliminated.

The second object of this invention is to provide a method and apparatus for measuring optical distances whereby any leakage signal is measured independently, the leakage signal component is removed from the distance-measuring signal influenced by the leakage signal, thereby obtaining an accurate distance-measuring signal to provide correct distance-measuring data.

The third object of this invention is to provide an optical distance-measuring apparatus which is capable of eliminating the leakage signal simply by supplementing only part of the apparatus without altering the constitution of the conventional optical distance-measuring apparatus too much.

In an optical distance-measuring method which comprises receiving a light from a light-emitting source radiating modulated light at a light-receiving source by reflecting the light from a point whose distance is being measured, measuring the distance to the point from the phase difference between a modulating signal of the light-emitting source and a received signal from the light-receiving source, the objects mentioned above can be obtained by the optical distance-measuring method according to this invention which is improved so as to comprise a step of measuring a leakage signal the normal optical path from the light-emitting source to the light-receiving source is interrupted, a step of measuring a distance-measuring signal without interrupting the normal optical path, and a step of measuring the distance to the point by correcting the distance-measuring signal according to the result obtained from measuring the leakage signal.

Further in an optical distance-measuring apparatus comprising a light-emitting means radiating modulated light, a light-receiving means receiving the light from the light-emitting means reflected from a point whose distance is being measured, a measuring means measuring the distance to the point from the phase difference between the modulating signal of the modulated light radiated from the light-emitting means and a received signal corresponding to the light received on the light-receiving means, the objects mentioned above can also be obtained by an optical distance-measuring apparatus according to this invention which comprises a normal optical path interruption means interrupting selectively the normal optical path from the light-emitting means to the light-receiving means, a leakage signal measuring means measuring a leakage signal obtained when the normal optical path interruption means has interrupted the normal optical path, a distance-measuring signal measuring means measuring a distance-measuring signal obtained when the normal optical path interruption means does not interrupt the normal optical path, and a correcting means correcting the distance-measuring signal according to the result obtained from measuring the leakage signal.

Thus the occurrence of a distance-measuring error due to a leakage signal which has been problematical hitherto can be eliminated by the optical distance-measuring method and optical distance-measuring apparatus of this invention.

According to the optical distance-measuring apparatus of this invention, the objects can be obtained by supplementing only part of the device without altering the main constitution of a conventional optical distance-measuring apparatus, so that a substantial increase in cost will not be incurred.

Furthermore, the complicated shielding structure and shading plate can be eliminated unlike in the conventional optical distance-measuring apparatus, therefore the apparatus can be miniaturized and so obtain a lightweight and simple construction.

DESCRIPTION OF THE PREFERRED EMBODIMENTS

Preferred embodiments the invention will now be described with refefence to the accompanying drawings. In the embodiments described hereinafter, the term "leakage signal" refers to a signal other than the normal signal from the transmitting system to the receiving system, which is defined to include:
(I) leakage signals due to electric field coupling,
(II) leakage signals due to magnetic field coupling,
(III) leakage signals due to leakage of electromagnetic waves,
(IV) leakages signal due to leakage from the power line,
(V) leakages signal due to leakage optical paths other than the normal optical path consisting of the external distance-measuring optical path or the internal reference optical path.

Figure 1:
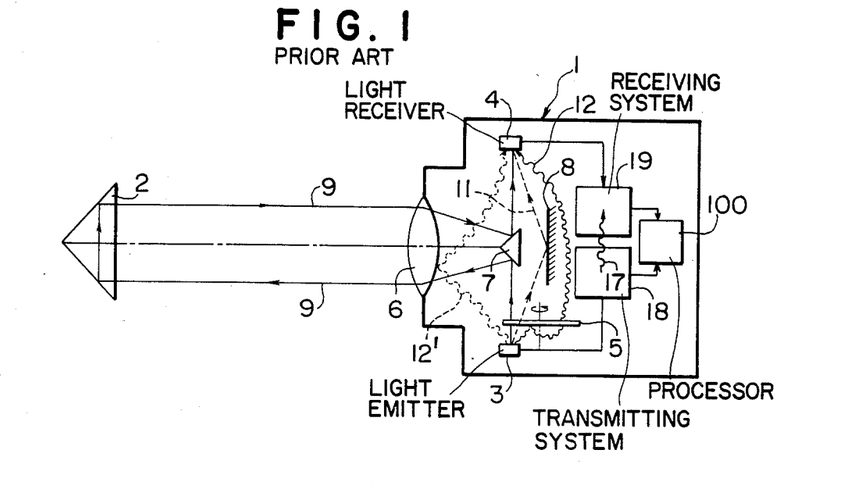
FIG. 1 is a drawing illustrating a conventional type of optical distance-measuring apparatus showing the correlations between the distance-measuring optical path, the leakage optical path and the electrical leakage signals.

FIG. 1 is a schematic drawing of the constitution of an optical distance-measuring apparatus, wherein a reflector such as a corner cube 2 is placed at a point whose distance from the apparatus is to be measured, separate from an optical distance-measuring apparatus body 1. A light-emitting element 3 such as a light-emitting diode or a laser diode and a light-receiving element 4 consisting of a photodiode or the like are disposed within the body 1. Light from the light-emitting element 3 is selected by a chopper 5 and is projected by way of a reflecting prism 7 and an objective lens 6. The light from the objective lens 6 is reflected by the corner cube 2 so as to return to the optical distance-measuring apparatus body 1, passes through objective lens 6 and is then reflected by the reflecting prism 7 into the light-receiving element 4. This route of the light constitutes an external distance-measuring optical path 9. Similarity, an internal reference optical path 11 from the light-emitting element 3 to the light-receiving element 4 through a reflector 8 is formed within the body 1.

The light-emitting element 3 radiates modulating waves corresponding to a modulating signal from a transmitting system 18; the light-receiving element 4 generates a receiving signal according to the incident light and provides it to a receiving system 19. The phase difference between the modulating signal transmitted from the transmitting system 18 and the receiving signal received by receiving system 19 is subjected to an arithmetic operation in a processing circuit 100 to obtain measured distance data. The light from the light-emitting element 3 is directed selectively to the reflecting prism 7 and the reflector 8 by the chopper 5 and is emitted into the external distance-measuring optical path 9 and the internal reference optical path 11 alternately. The internal reference optical path 11 is intended to remove the influences of response delays or temperature drift in the various electric circuits constituting the optical distance-measuring apparatus. In the optical distance-measuring apparatus there are leakage optical paths 12 reflected from the chopper 5, the bearing mountings of the optical parts, and the internal walls of the apparatus, reaching the light-receiving element 4, or leakage optical paths 12' reflected from the optical parts, themselves and reaching the light-receiving element 4 other than by the normal optical path described above.

In the optical distance-measuring apparatus there are also electrical leakage signals caused by electric fields, magnetic fields, electromagnetic waves, etc., which may also exert a large influence on the distance-measuring accuracy in the electric circuit comprising the transmitting system, receiving system, processing circuit, etc., which constitute the apparatus.

Figure 2:
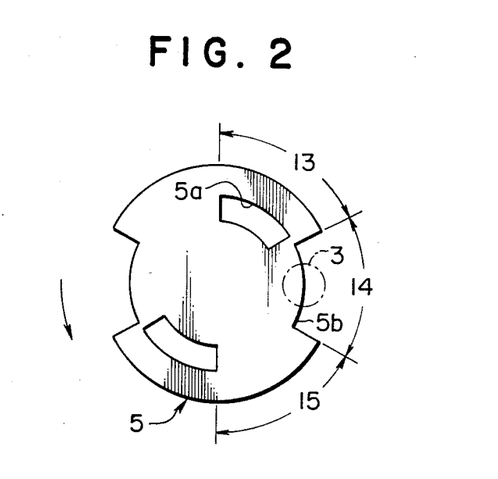
FIG. 2 is a plan view of one example of a chopper for an optical distance-measuring apparatus.

FIG. 2 represents one example of the chopper 5 used in this invention, the chopper 5 comprising an internal reference domain 13 having an opening 5a through which the light from the light-emitting element 3 is allowed to pass toward the reflector 8, an external distance-measuring domain 14 having a peripheral notch 5b through which the light is allowed to pass toward the reflecting prism 7, and a dark domain 15 for interrupting the light from the light emitting element 3. In the drawing the arrow indicates the direction in which the chopper 5 rotates.

Figure 3:
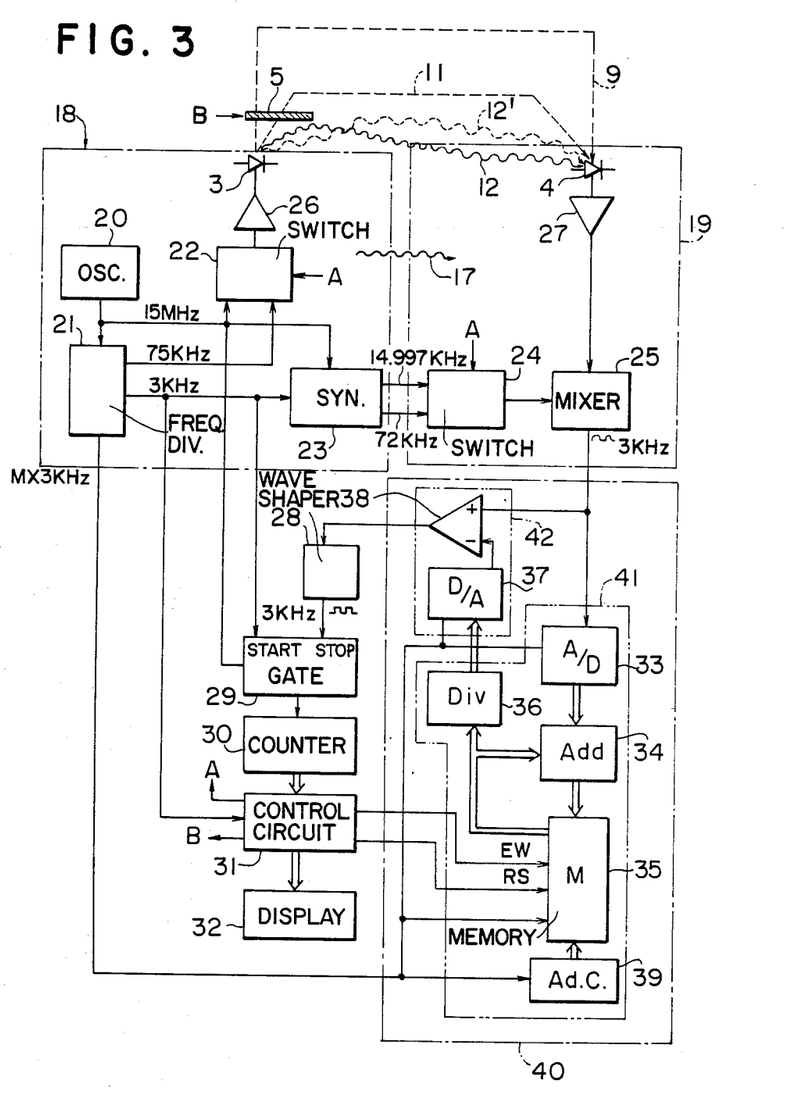
FIG. 3 is a block diagram of the first embodiment of this invention.

FIG. 3 represents the electric circuit in detail, wherein an oscillator 20 generates a 15 MHz signal and supplies the signal to each of a frequency divider 21, a first switch 22, a synthesizer 23, and a gate circuit 29. The frequency divider 21 divides the 15 MHz signal from the oscillator 20 and outputs 75 KHz, 3 KHz and "MX3 KHz" (i.e. M times 3 KHZ where M represents an arbitrary number) signals. The synthesizer 23 outputs a 14,997 MHz signal which is 3 KHz lower than the 15 MHz signal and a 72 KHz signal which is 24 times 3 KHz to a second switch 24 in the receiving system 19.

The first switch 22 outputs a signal of either 15 MHz or 75 KHz to an amplifier 26 according to a signal A from a processing control circuit 31. The amplifier 26 is a power amplifier which drives the light-emitting element 3 consisting of a light-emitting diode or a laser diode. The oscillator 20, frequency divider 21, first switch 22, synthesizer 23, amplifier 26 and light-emitting element 3 constitute the transmitting system 18.

The modulated light from the light-emitting element 3 is incident onto the light-receiving element 4 consisting of an avalanche photodiode, etc., via the external distance-measuring optical path 9 or the internal reference optical path 11. An amplifier 27 is a preamplifier for amplifying signals from the light-receiving element 4. The second switch 24 outputs the signal of either 14,997 MHz or 72 KHz to a mixer 25 according to the signal A from the processing control circuit 31. The mixer 25 mixes the signal from the amplifier 27 with a signal from the second switch 24 and outputs a 3 KHz sine wave which is a difference signal of the two. The light-receiving element 4, amplifier 27, second switch 24 and mixer 25 constitute the receiving system 19.

The output signal from the first switch 22 and the output signal from the second switch 24 are switched by the signal A from the processing control circuit 31 so that the second switch 24 selects the 14,997 MHz signal when the first switch 22 has selected the 15 MHz signal, and the second switch 24 selects the 72 KHz signal when the first switch 22 has selected the 75 KHz signal. Therefore the output signal of the mixer 25 is a 3 KHz sine wave in either case.

In this embodiment, the output of the mixer 25 is input to a leakage signal eliminating unit 40 which will be described later, however, the description below will refer to the constitution and action of a conventional optical distance-measuring apparatus without the leakage signal eliminating unit 40 for easy understanding of the general constitution and action of the optical distance-measuring apparatus. In a conventional optical distance-measuring apparatus, the output from the mixer 25 is connected directly to a waveform shaper 28. The waveform shaper 28 then converts the 3 KHz sine wave which is the signal output from the mixer 25 into a rectangular wave and outputs it. With the rise (or fall) of the 3 KHz signal from the frequency divider 21 as a start signal and the rise (or fall) of the 3 KHz rectangular wave signal from the waveform shaper 28 as a stop signal, the gate circuit 29 outputs the 15 MHz signal from the oscillator 20 which is being output during this period of time to a counter 30. The counter 30 counts the 15 MHz signal from the gate circuit 29. The counted value corresponds to the phase difference between the 3 KHz signal from the frequency divider 21 and the 3 KHz signal from the waveform shaper 28. The phase of the 3 KHz signal which is the signal output from the mixer 25 corresponds to the phase of the received light, therefore the discrete value obtained by the counter 30 corresponds to the length of the optical path between the optical distance-measuring apparatus body and the point whose distance is being measured.

In this embodiment, the frequency of the modulated light uses, as described above, the two kinds of optical waves 15 MHz and 75 KHz. The former has a 20 m wavelength and is used for fine measurements; the latter has a 4 km wavelength and is used for coarse measurement.

The processing control circuit 31 executes the following processing and controls:

(1) It selects the 15 MHz frequency for the modulated light. Namely, the signal A is output so that the output from the first switch 22 is 15 MHz and the output from the second switch 24 is 14,997 MHz. The chopper 5, which is an optical path switch, is controlled by a signal B to select the external distance-measuring optical path 9, and a discrete value a from the counter 30 is obtained corresponding to the external distance-measuring optical path 9.

(2) It then controls the chopper 5 by the signal B to select the internal reference optical path 11. A discrete value a' from the counter 30 is obtained corresponding to the internal reference optical path 11. Since the received light is faint, the phase difference measurement will obtain a different discrete value every time. Therefore, mean values of the discrete values a and a' corresponding to n measurements are required.

(3) The difference (a−a') between the discrete values a and a' is obtained, which is converted into a distance to provide a fine measured value.

(4) The processing control circuit 31 then selects the 75 KHz frequency for the modulated light. Namely, the signal A is output so that the output from the first switch 22 is 75 KHz and the output from the second switch 24 is 72 KHz. Discrete values b, b' are obtained in the same way as in (1) and (2).

(5) The difference (b−b') between the discrete values b, b' is obtained, which is converted into a distance to provide a coarse measured value.

(6) The fine measured value and the coarse measured value are combined and displayed on a display 32 as the measured distance.

This embodiment has the characteristic of adding a leakage eliminating unit 40 to the conventional type of optical distance-measuring apparatus, and also improving the chopper 5 accordingly. Namely, as described above, the chopper 5 has a constitution wherein the dark domain 15 is further added to the conventional chopper. The leakage signal is measured when the light-emitting element 3 is opposite to the dark domain 15. Namely, the principle is that the signal output from the receiving system 19 when the chopper 5 has selected neither the external distance-measuring optical path 9 nor the internal reference optical path 11 is an output due to leakage signals. The optical path switch is not necessarily limited to having the external distance-measuring domain 14, the internal reference domain 13 and the dark domain 15 within one chopper, as in this embodiment, but a conventional chopper with an external distance-measuring domain and an internal reference domain can be combined with another chopper, and it goes without saying that the chopper is not necessarily limited to a mechanical chopper as in this embodiment, but a photoelectric element such as a liquid crystal or photochromic glass can be used therefor.

In FIG. 3, the leakage signal eliminating unit 40 is classified largely into a leakage signal measuring section 41 and a correcting section 42. The leakage signal measuring section 41 is constituted of an A/D converter 33 dividing the period of the leakage signal by M to convert it into a digital signal, a memory 35 storing the M-divided data output from the A/D converter 33, an address counter 39 coordinating the M-divided leakage signal with its address in the memory 35, an adder 34 averaging the leakage signal over N cycles, and a divider 36 providing 1/N for the averaging.

The correcting section 42 is constituted of a D/A converter 37 converting the data of the averaged leakage signal sequentially into an analog signal, and a differential amplifier 38 subtracting an output signal of the D/A converter 37 from the output signal of the receiving system obtainable during the distance measurement (signifying both the external distance-measurement and the internal reference), i.e. the output signal from the mixer 25.

The A/D converter 33 converts the output signal from the mixer 25 into a digital signal according to the "MX3 KHz" signal from the frequency divider 21. The adder 34 adds the output data from the A/D converter 33 and output data from the memory 35 and outputs it again to the memory 35. As exemplified by a RAM and others, the memory 35 has an internal storage element selected in digits (8-bit units, for example) by addressing, and is controlled to have writable or unwritable status by an EW signal from the processing control circuit 31. The internally stored status is reset by an RS signal from the processing control circuit 31. (The status is kept as it is before the measurement of the leakage signal is carried out.) When in writable status according to the EW signal, the "MX3 KHz" signal from the frequency divider 21 is written as writing pulses.

The address counter 39 is constituted of an M-counter which counts the "MX3 KHz" signal from the frequency divider 21 to provide addressing. Since the data is data obtained by adding N times on the adder 34 is stored as that from the memory 35 after the leakage signal has been measured, a value which is N times the leakage signal is stored. The divider 36 divides the data from the memory 35 with 1/N to obtain a value of the leakage signal which is as large as it was originally. When, for example, a digital conversion is carried out to have N given as a binary code by $2^{Nb}$ from the digital signal from the A/D converter 33, the divider 36 can be omitted from the construction by supplying a binary code from the memory 35 to the D/A converter 37 which is moved Nb bits downward. Then the divider 36 can be constituted of a resistance type of potential divider, which can be provided after the D/A converter 37.

The D/A converter 37 converts the digital signal which is the output signal from the divider 36 into an analog signal. The differential amplifier 38 subtracts the output signal from the D/A converter 37 from the output signal from the mixer 25 and supplies it to the waveform shaper 28. The "MX3 KHz" signal from the frequency divider 21 is supplied to each of the D/A converter 37, A/D converter 33, memory 35 and address counter 39, therefore each component of the leakage signal eliminating unit 40 operates synchronously.

Figure 4:
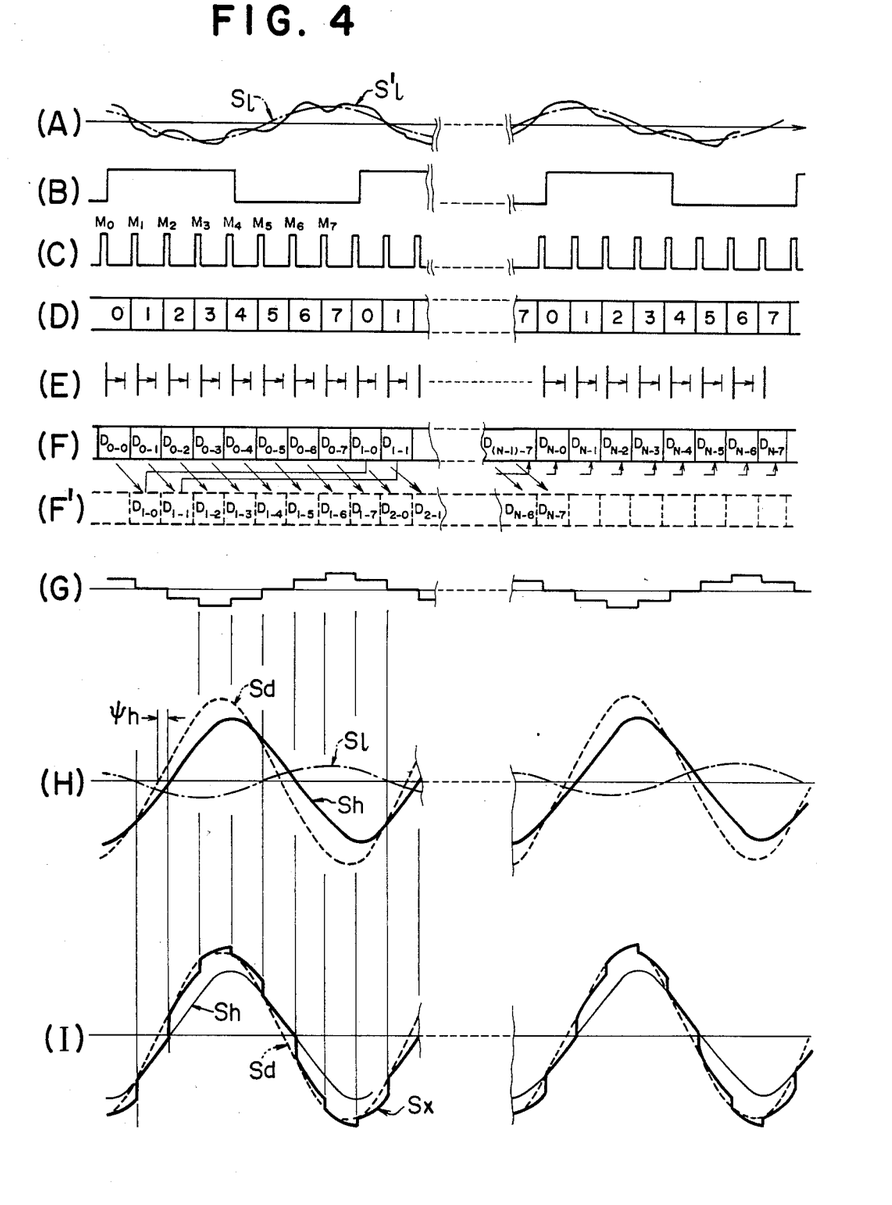
FIG. 4 is a waveform diagram for describing the operation of the leakage signal eliminating unit of the first embodiment.

To describe the actions of the leakage signal eliminating unit 40 with the above constitution, FIG. 4 is a timing chart including the relation between the leakage signal $S_l$ and the normal signal Sd. In FIG. 4., (A) to (F') represent the case when the dark domain 15 of the chopper 5 is opposite the light-emitting element 3, i.e. the step of measuring the leakage signal; (G) to (I) represent the case when the internal reference domain 13 or the external distance-measuring domain 14 is kept opposite the light-emitting element 3, i.e. the correcting step during the distance measurement.

$S'_l$ (the solid line) of FIG. 4 (A) represents the output waveform of the mixer 25. $S_l$ (the dot-dash line) represents the leakage signal component. The signals handled in the optical distance-measuring apparatus are faint, therefore the gain of the receiving system will have to be large, so that noise from electrical parts cannot be neglected. The noise is random noise which has nothing to do with the modulating signals, and the output of the mixer 25 is the waveform $S'_l$ with random noise added to the leakage signal $S_l$. In the embodiment, the leakage signal measuring section 41 has a means for averaging N values, thereby minimizing the influence of random noise. (This corresponds to averaging phase difference measurements carried out N times.)

FIG. 4 (B) is a waveform diagram representing the 3 KHz output signal from the frequency divider 21 and (C) is a waveform diagram representing the "MX3 KHz" output signal from the frequency divider 21, taking the example of M=8. (D) is an illustrative drawing representing the count of the address counter 39, wherein the count is incremented by one at the rise of the "MX3 KHz" signal. (It is constituted as an octal counter according to the above condition M=8.) The arrows in (E) indicate the time taken for the A/D conversion operation of the output waveform $S'_l$ from the mixer 25 when the "MX3 KHz" signal falls. (F) is an illustrative drawing showing the output data from the memory 35, the output data signifying the stored contents according to what is specified by the address counter. Writing to the memory 35 is carried out by the rise of the "MX3 KHz" signal. When the content of the address counter 39 is 0, the output from the memory 35 is $D_{0\text{-}0}$ as shown in (F). When the A/D converter 33 ends its A/D conversion under the above status, the output data from the adder 34 is output as $D_{1\text{-}0}$ with the $D_{0\text{-}0}$ output added to the data obtained by the A/D conversion. Then $D_{1\text{-}0}$ is rewritten into the memory 35 at the timing of the rise of the signal $M_1$ of the "MX3 KHz" signal, in other words the content $D_{0\text{-}0}$ of address 0 of the address counter 39 is replaced with $D_{1\text{-}0}$. (This is shown in (F').) Then 1 is added to the count of the address counter 39 at timing of the rise of the signal $M_1$, the count content now being $0+1=1$, and the data $D_{0\text{-}1}$ is output, as shown in (F), from the memory 35. Next, the A/D converter 33 restarts its operation for A/D conversion at the timing of the fall of the signal $M_1$. When the A/D conversion ends, the data thus obtained and the output data $D_{0\text{-}1}$ from the memory 35 are added by the adder 34, and the data $D_{1\text{-}1}$ is output to the memory 35. The stored content of address 1 is rewritten from $D_{0\text{-}1}$ to $D_{1\text{-}1}$ at the rise timing of the signal $M_2$. At the same time, 1 is added to the count of the address counter 39 to make it $1+1=2$. Thus the output from the memory 35 is data $D_{0\text{-}2}$. The contents of the memory 35 are thus changed successively in each cycle of 3 KHz as $(D_{0\text{-}0}, D_{0\text{-}1} \ldots D_{0\text{-}7}) \rightarrow (D_{1\text{-}0}, D_{1\text{-}1} \ldots D_{1\text{-}7}) \rightarrow (D_{2\text{-}0}, D_{2\text{-}1} \ldots D_{2\text{-}7}) \rightarrow \ldots \rightarrow (D_{N\text{-}0}, D_{N\text{-}1} \ldots D_{N\text{-}7})$ by repeating the above operations in sequence. The repeated operations are executed over N cycles for the cycle of the 3 KHz signal from the frequency divider 21 (or the cycle of the leakage signal). The operation is ended by the processing control circuit 31 counting the 3 KHz signal as a clock pulse, and controlling EW signal when the count reaches N to keep the memory 35 in the unwritable status. By resetting beforehand the output data as $D_{0\text{-}0}=D_{0\text{-}1}=D_{0\text{-}2}=\ldots=D_{0\text{-}7}=0$, the data $D_{N\text{-}0}, D_{N\text{-}1}, \ldots D_{N\text{-}7}$ which is written into the memory 35 after the operation has ended N times will be data in which the leakage signal at each division point (the division points corresponding to the division number M=8 being $M_0, M_1, M_2 \ldots M_7$) has been added N times. By outputting the data $D_{N\text{-}0}, D_{N\text{-}1}, \ldots D_{N\text{-}7}$ (more generally, $D_{N\text{-}0}, D_{N\text{-}1}, \ldots D_{N\text{-}(M\text{-}1)}$) to the divider 36, each average piece of data divided with 1/N will be obtained by the output from the divider 36. This is the step of measuring the leakage signal.

The output waveform when each averaged piece of data from the divider 36 is subjected to D/A conversion by the D/A converter 37 as the "MX3 KHz" signal falls is shown in (G). The waveform of (G) is repeated during the distance measurement. The $S_h$ waveform in (H) is the output signal from the mixer 25 during the distance measurement, it is a composite signal of the leakage signal $S_l$ added to the normal signal $S_d$. The composite signal $S_h$ has a phase delayed by $\psi_h$ from the normal signal $S_d$ by the leakage signal $S_l$.

$S_x$ in (I) is the waveform of the output signal from the differential amplifier 38. The waveform of the output signal $S_x$ is the output waveform from the D/A converter 37 shown in (G) subtracted from the $S_h$ waveform. It may be seen that the output signal $S_x$ is similar to the normal signal $S_d$. This is the correction step during the distance measurement.

As described above, the output signal from the leakage signal eliminating unit 40 becomes the normal signal with the leakage signal eliminated during the distance measurement. Thus the phase difference or the distance can be measured without any influence of the leakage signal by using the leakage signal eliminating unit 40.

The phase and magnitude of the leakage signal are peculiar to the individual optical distance measuring apparatus and are regarded as almost constant. A drift phenomenon in the leakage signal during temperature changes should be taken into consideration, but since the drift phenomenon would exert only a small influence on the distance-measuring accuracy, occasional measurements are sufficient for the leakage signal, and therefore the leakage signal is measured once when the power is switched on and then left as it is during the distance measurement thereafter. However, the leakage signal acting on a 75 KHz modulating signal and the leakage signal acting on that of 15 MHz have different leakage conditions, and hence a different phase and magnitude may result accordingly. Therefore, the memory 35 needs to have two exclusive domains: a storage domain for the leakage signal during 75 KHz modulation and another storage domain for the leakage signal during 15 MHz modulation. Namely, the memory 35 needs to have MS storage addresses (S being the number of different modulation frequencies and M the division number thereof) of storage domains (addresses).

Figure 5:
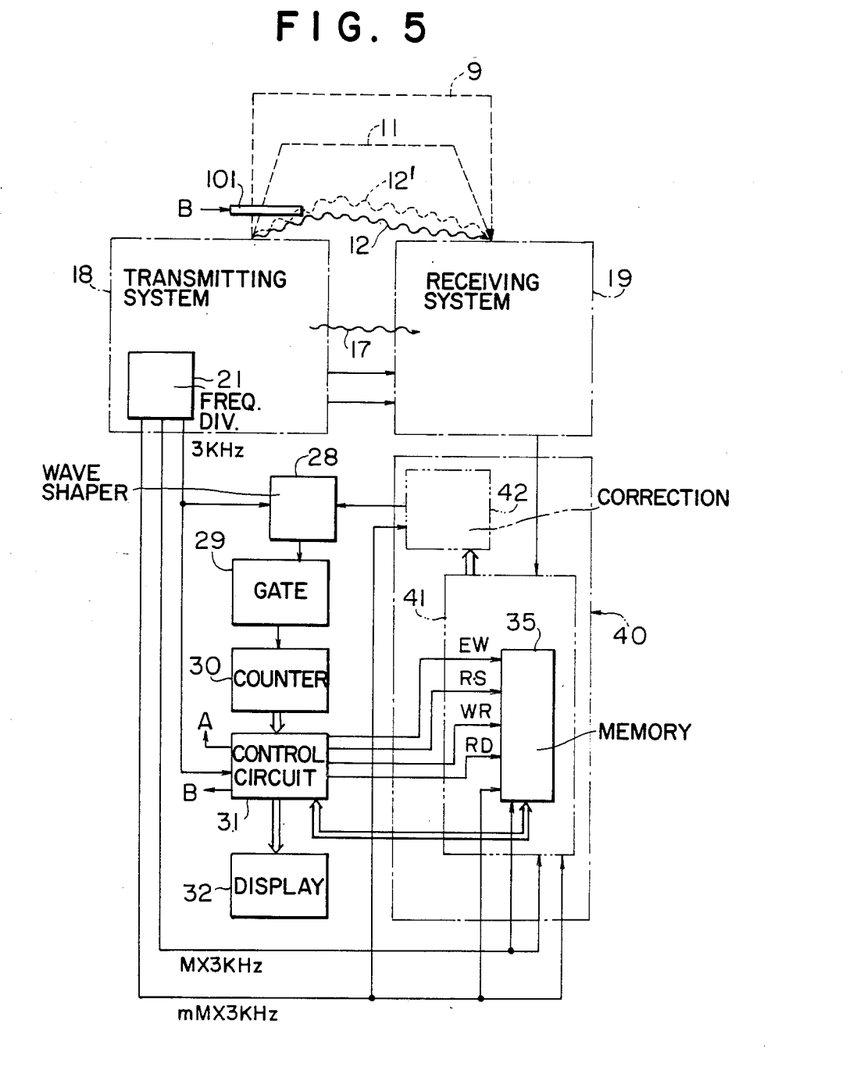
FIG. 5 is a block diagram of an optical distance-measuring apparatus of the second embodiment of this invention.

The greater the division number is, the less the correction error becomes. However, when a sufficiently large M is not to be expected due to restrictions by the electric circuits or particularly to restrictions based on the A/D conversion rate of the A/D converter, a better effect will result from approximating the interval between output data linearly at each division point so as to decrease. A concrete constitution therefor is shown in FIG. 5. In the block diagram of FIG. 5, like characters refer to like components to those in the above first embodiment, thereby any further description thereof is omitted.

A read signal RD and a write signal WR are connected to the memory 35 of the leakage signal measuring section 41 so that the memory contents can be read and written by the processing control circuit 31. As well as the "MX3 KHz" signal, an "mMX3 KHz" signal (m being an integer) is supplied to the leakage signal eliminating unit 40 from the frequency divider 21. The leakage signal measurement is controlled by the "MX3 KHz" signal, and the distance measurement by the "mMX3 KHz" signal. The above m is a value that will further divide by m the intervals between the division points which are already divided by M, which could be, for example, m=5. The address counter 39 is an mM-counter of which the upper position counts in m and the lower in M, and is operated by the "mMX3 KHz" signal. When the m-scale of the upper position is reset, the counter operates on the M-scale of the lower position for the leakage signal measurement and also operates on the mM-scale for the distance measurement. The other components are all identical to those in the embodiment of FIG. 3. When the leakage signal has been measured, the arithmetic operation for correction will be carried out by the processing control circuit 31. The interval between the M-divided points is further divided into m to obtain a value of each point as:

$$D_{N-(M'-1)} + \frac{D_{N-(M')} - D_{N-(M'-1)}}{m} m' \qquad (6)$$

where
$M' = 1 + 2 + \ldots + (M-1)$
$m' = 0 + 1 + 2 + \ldots + (m-1)$

Namely, the values obtained by having the interval between the M-divided points approximated linearly are:

$D_{N-0(0)}, D_{N-0(1)}, D_{N-0(2)}, D_{N-0(3)}, D_{N-0(4)}$ $D_{N-1(0)}, D_{N-1(1)}, D_{N-1(2)}, D_{N-1(3)}, D_{N-1(4)}$

.

.

.

$D_{N-6(0)}, D_{N-6(1)}, D_{N-6(2)}, D_{N-6(3)}, D_{N-6(4)}$

These are written into the memory 35 in order together with $D_{N-7}$.

Figure 6:
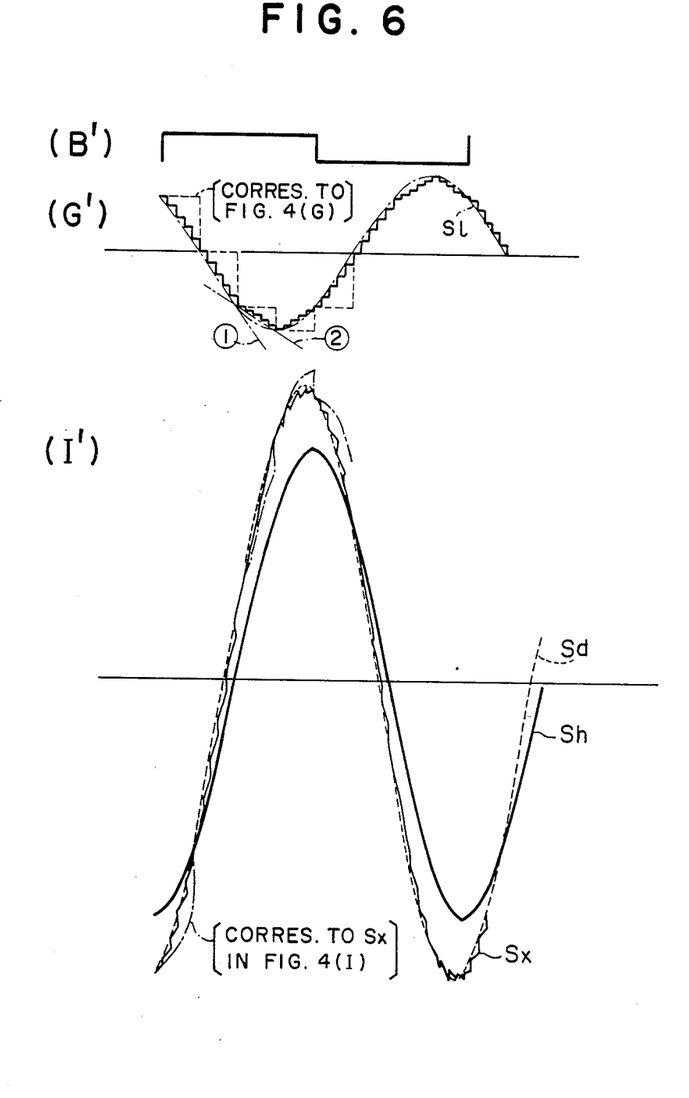
FIG. 6 is a waveform diagram for describing the actions of the second embodiment.

A more detailed correction is obtainable by operating the address counter in the mM-scale during the distance measurement. The status is shown in FIG. 6, wherein (B'), (G') and (I') are waveform diagrams corresponding to (B), (G) and (I) of FIG. 4 respectively. In FIG. 6 (G'), the waveform given by the broken line indicates the waveform of FIG. 4 (G). The straight line ① in the drawing indicates the straight line used to divide the interval between the output data $D_{N-1}$ and $D_{N-2}$ into m, and the straight line ② indicates the straight to divide the interval between the output data $D_{N-2}$ and $D_{N-3}$ into m. Thus the output waveform from the D/A converter is more detailed than that of the first embodiment, therefore it is understood that it approximates more closely to the leakage signal $S_l$ when compared with the output waveform of FIG. 4 (G). FIG. 6 (I') represents the case when the output signal $S_x$ from the differential amplifier 38 is nearer to the normal signal $S_d$ than that of FIG. 4 (I). This may suggest that this embodiment is capable of providing a more accurate measurement of distance.

It is usual that the processing control circuit 31 of the optical distance-measuring apparatus converts a phase difference into a distance and has the function of an arithmetic operation for synthesizing a fine measurement and a coarse measurement or for correcting for atmospheric conditions. The arithmetic operation of the leakage signal eliminating unit 40 can be coordinated by this function of the processing control circuit 31, and the circuit can be simplified accordingly. Further, if the correcting section 42 can be coordinated by the arithmetic operation, then the correction can be performed by the arithmetic operational function of the processing control circuit 31 to simplify the circuit.

Figure 7:
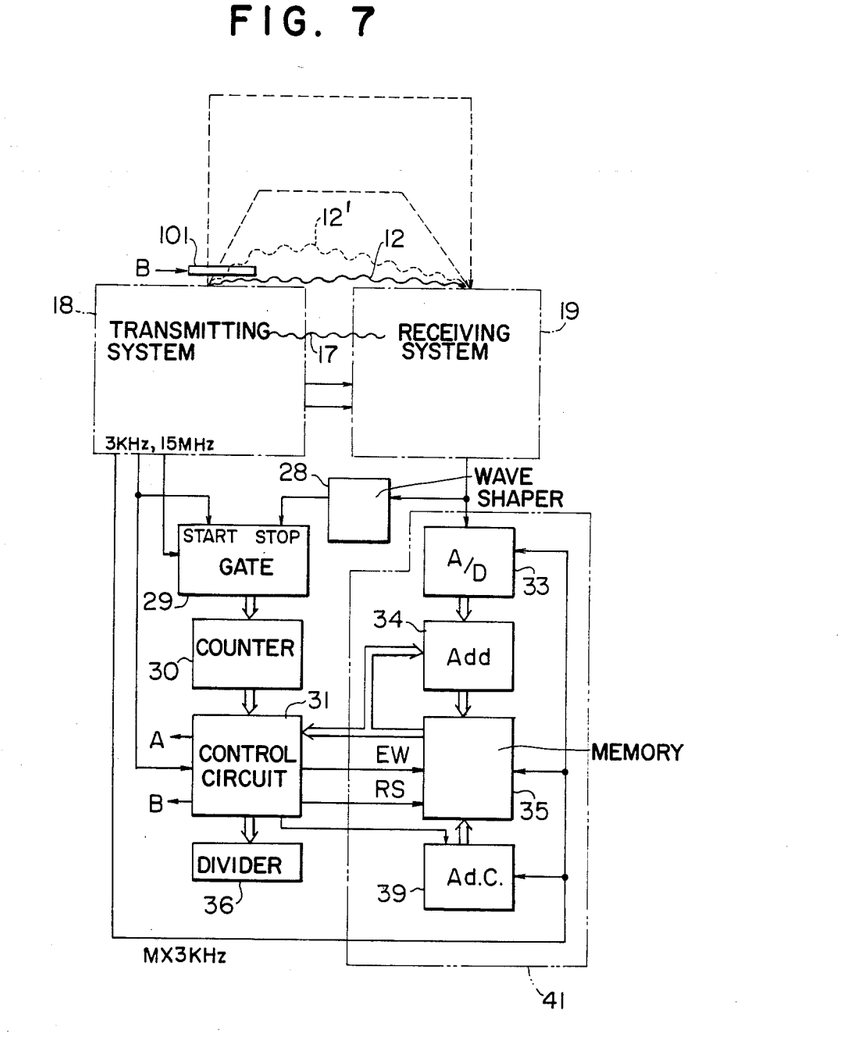
FIG. 7 is a block diagram of an optical distance-measuring apparatus putting the third and fourth embodiments of this invention into practice.

FIG. 7 is a block diagram representing the case wherein the correction for the leakage signal is performed by an arithmetic operation. The measurement of the leakage signal is similar to that in the first embodiment given in FIG. 3, therefore a further description will be omitted. In FIG. 7, the processing control circuit 31, while controlling the address counter 39, inputs the measured data of the leakage signal to the processing control circuit 31 from the memory 35. At the same time, the data is adjusted by 1/N therefor. (Processing coordinated with the divider 36 of FIG. 5). Measured date $\theta$ of the phase difference during the distance measurement is brought from the counter 30. The measured data $\theta$ of the phase difference refers to the phase difference between the interval from the rise (or fall) of the 3 KHz signal from the frequency divider 21 (a rise of the "MX3 KHz" signal $M_0$) to the rise (or fall) of the output signal from the waveform shaper 28 (the zero-crossing point of the rise of the composite signal $S_h$). When it is corrected by the arithmetic operation, a phase increment $\psi_h$ due to the leakage signal will be obtained therefor. Two embodiments of the method will be described hereafter with reference to the drawings.

Figure 8:
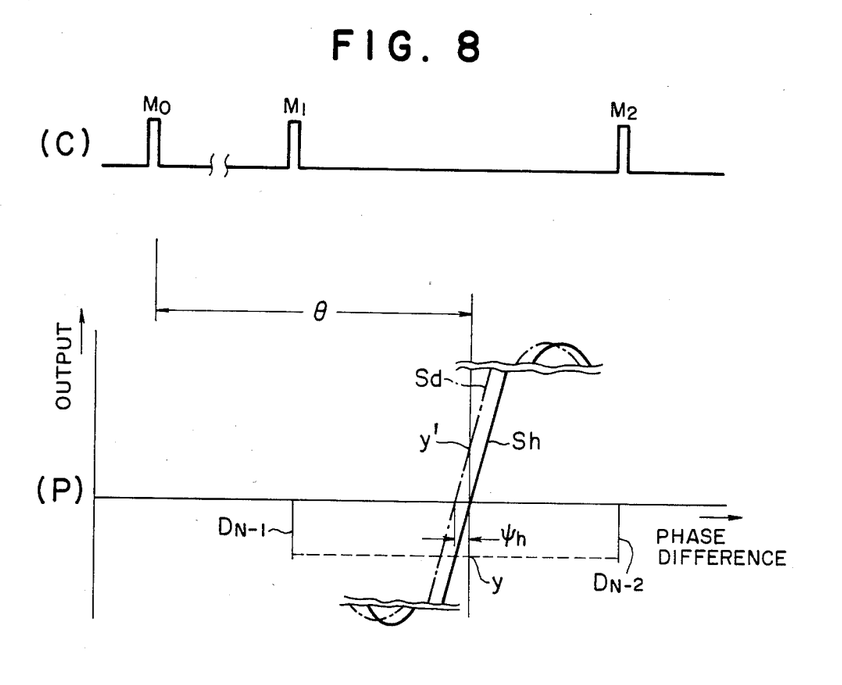
FIG. 8 is a waveform diagram for describing the actions of the third embodiment.

The first method (corresponding to the third embodiment of this invention) is described with reference to FIG. 8. FIG. 8 (C) is a waveform diagram showing the "MX3 KHz" signal, wherein it is coordinated with the phase of the 3 KHz signal. (P) is a waveform diagram enlarged to show a zero-crossing point of the composite signal $S_h$ and its neighborhood, wherein the phase difference is along the abscissa, and the normal signal $S_d$ and the composite signal $S_h$ including the magnitude of the measured data of the leakage signal input to the processing control circuit 31 from the memory are given along the ordinate. The following is a description of the sequence of arithmetic operation steps for the correction:

(1-1): Selection of measured data of two adapted leakage signals.

The measured data of two leakage signals approximate to the phase difference $\theta$ can be selected by dividing the measured phase difference data $\theta$ at the time of distance measurement by the division pitch $2\pi/M$ of the phase through division by M. If $$K = \frac{M}{2\pi} \theta \tag{7}$$

then k which satisfies $$\alpha \leq k < \alpha+1 \tag{8}$$

where $\alpha = 0, 1, 2 \ldots (M-7)$ is obtained, and $D_{N-\alpha}$ and $D_{N-(\alpha+1)}$ are selected. Provided that $D_{N-M}$ is equal to $D_{N-0}$ ($D_{N-8} = D_{N-0}$ when M=8), in FIG. 8, $\alpha = 1$. Then, $D_{N-1}$ and $D_{N-2}$ of FIG. 8 (P) indicate the magnitude (output) of the data of the leakage signals obtained at the fall time of $M_1$, $M_2$ of the "MX3 KHz" signal.

(1-2): Determination of the magnitude y of the leakage signal at a zero-crossing point of the composite signal $S_h$.

This is obtained by a linear approximation equation:

$$Y = D_N-(\alpha) + \}D_N-(\alpha+1) - D_N-(\alpha)\} (K-\alpha) \tag{9}$$

y in FIG. 8 is a value obtained by equation (9). If the leakage signal is approximately a straight line between $D_{N-1}$ and $D_{N-2}$, then y becomes a value approximately at the point $\theta$ of the leakage signal.

(1-3): Correction of measured phase difference data during distance measurement.

y' in FIG. 8 is the value of the normal signal $S_d$ at the point $\theta$, and $$y' = d \sin\psi_h \approx -y$$

Therefore, $$\psi_h \approx -\sin^{-1}\frac{y}{d} \tag{10}$$

and thus the corrected phase difference $\theta'$ is expressed as:

$$\theta' = \theta - \psi_h \tag{11}$$

$$\approx \theta + \sin^{-1}\frac{y}{d}$$

If the amplitude d of the normal signal is sufficiently larger than the amplitude 1 of the leakage signal, $d \gg y$, $d \approx h$ (h being the amplitude of the composite signal), and hence the phase increment $\psi_h$ due to the leakage signal can be handled as:

$$\psi_h - y/h \tag{12}$$

Therefore, the corrected phase difference measured data $\theta'$ during the distance measurement is obtainable as:

$$\theta' = \theta - \psi_h \tag{13}$$

$$= \theta + \frac{y}{h}$$

In the optical distance-measuring apparatus, the amplitude h ($\approx d$) of the hybrid signal is a value set beforehand, and a light-regulating means (not illustrated) is generally provided in front of the light-receiving element so that the output of the signal during the distance measurement will be controlled to be that set value. If the value of h changes, the value of the amplitude h will have to be measured by other means. The leakage signal measuring section 41 can be utilized as that means. Namely, the value of h can be obtained by measuring the signal during the distance measurement in the same way as the measurement of the leakage signal and obtaining its maximum value.

Next, the measurement steps of the second method will be described with reference to FIG. 9.

(2-1): Determination of the phase difference $\psi_l$ between the 3 KHz signal and the leakage signal.

First, $\alpha$ satisfying $$D_{N-(\alpha)} \leq 0 < D_{N-(\alpha+1)} \tag{14}$$

where $\alpha = 0, 1, 2 \ldots (M-1)$
$D_{N-M} = D_{N-0}$ is obtained, and the phase difference $\psi_l$ at a zero crossing point is obtained from the linear approximation equation:

$$\psi_l = \left| \frac{2\pi a}{M} \right| + \left| \frac{2\pi/M}{D_{N-(a+1)} - D_{N-(a)}} D_{N-(a)} \right| \quad (15)$$

Figure 9:
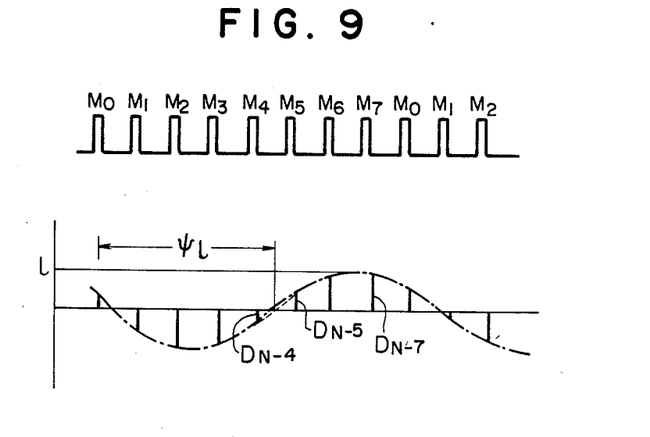
FIG. 9 is a waveform diagram for describing the actions of the fourth embodiment.

FIG. 9 represents the case when $\alpha=4$, indicating the phase at a zero-crossing point obtained by the phase difference $\psi_l$. When the leakage signal is approximately a straight line between $D_{N-(a)}$ and $D_{N-(a+1)}$, the obtained phase difference $\psi_l$ can be handled as the phase difference of the leakage signal from the 3 KHz signal.

(2-2): Determination of the maximum value 1 of the leakage signal.

The largest piece of data from $D_{N-0}$, $D_{N-1}$, ... $D_{N-(M-1)}$ is obtained. In FIG. 9 it is $D_{N-7}$, this is the output value closest to the maximum value 1, and is handled as the maximum value 1.

(2-3): Correction of the measured phase difference data.

Since the relationship $\theta=\psi_d+\psi_h$ holds, the measured phase difference data $\theta$ is obtained from $\psi_d=\theta-\psi_h$. Assuming, here, that the relationship $d>>1$ holds between the amplitude d of the normal signal and the amplitude 1 of the leakage signal, the amplitude h and phase increment $\psi_h$ of the composite signal can be obtained from equation (4) as:

$$h \approx d$$

$$\psi_h \approx 1/d \sin(\psi_l - \psi_d)$$

The value of the phase increment $\psi_h$ is minute value when $d>>1$, therefore the measured phase difference data $\theta$ during the distance measurement becomes approximately equal to the value of the phase $\psi_d$ of the normal signal. Therefore there will be no problems concerning the correction accuracy when obtaining $\psi_h$, if $\psi_d \to \theta$, $d \to h$, by:

$$\psi_h = \frac{l}{h} \sin(\psi_l - \theta) \quad (16)$$

The corrected phase difference $\theta'$ during the distance measurement can therefore be obtained by:

$$\theta' = \theta - \psi_h \quad (17)$$

$$= \theta - \frac{l}{h} \sin(\psi_l - \theta)$$

In each of the above embodiments, the averaging by the leakage signal measuring section 41 is a simple averaging done by adding N times of data and dividing the result by N, but such simple averaging is not necessarily absolute. When, for example, the output data from the A/D converter 33 is D' and the output data from the memory 35 is D, the data can be supplied to the memory 35 while the adder 34 is performing the next arithmetic operation.

$$\frac{D'}{A} + \frac{A-1}{A} D \quad (18)$$

When data from the A/D converter 33 is input in sequence to an operator with $A>>1$, and the repeated operation is executed thereon, the influence of new data is greater than that of old data in the contents of the memory 35, and when $A>>1$, the operation becomes similar to that of a smoothing circuit comprising a known resistance and capacitor. By utilizing this constitution, the measured data of the leakage signal can be replaced, bit by bit, with new data, and when the measured data of the leakage signal is changed to a new value, it is not necessary to add N times collectively as in the case of the previous embodiments, which is effective when the leakage signal is subject to a drift phenomenon.

The constitution of the leakage signal eliminating unit 40 in FIG. 3 is such that the output signal from the receiving system is converted into a digital signal for averaging however an analog signal from the receiving system 19 can be used directly to eliminate the leakage signal without it being converted into a digital signal.

Figure 10:
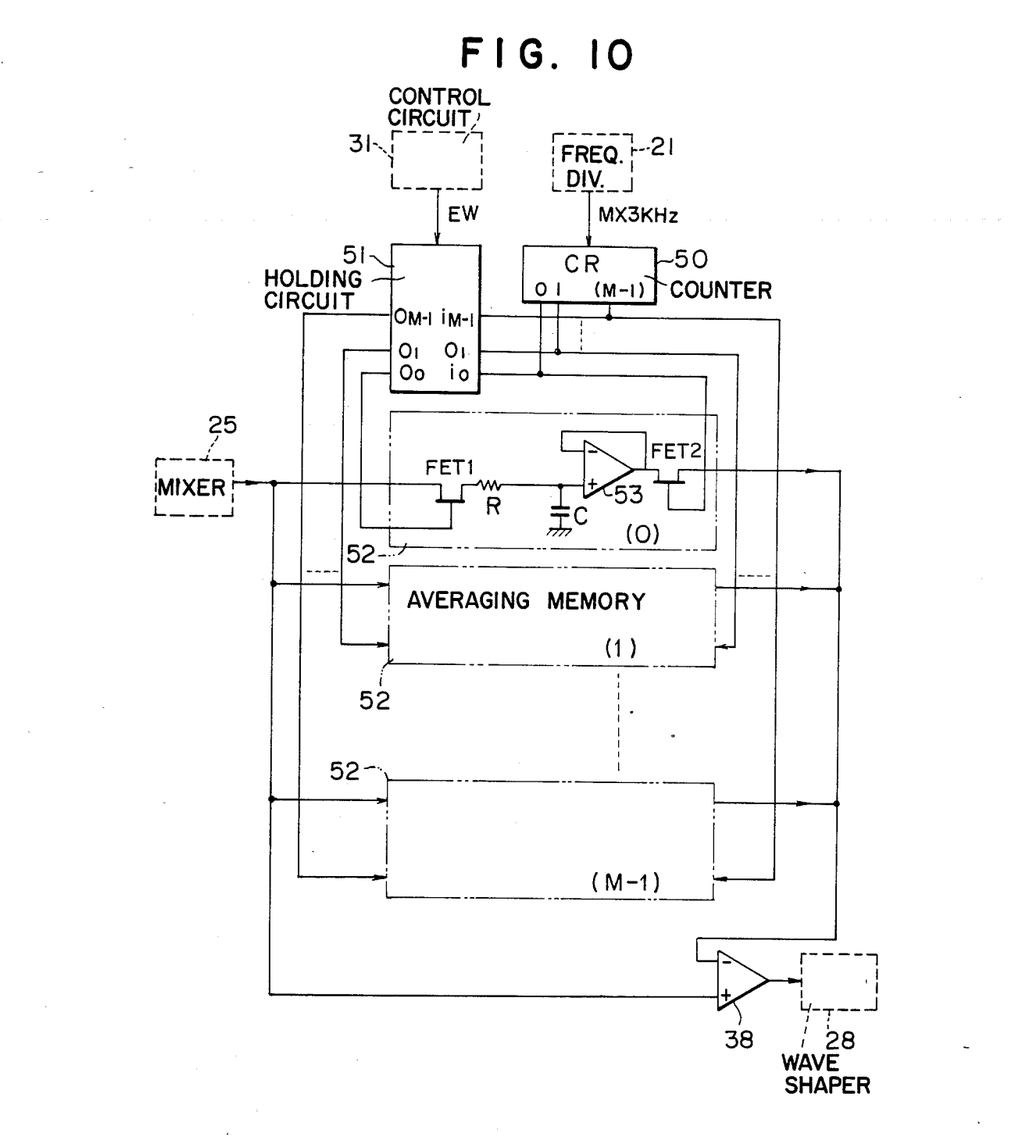
FIG. 10 is a circuit diagram showing only a leakage signal eliminating unit of the optical distance-measuring apparatus according to the fifth embodiment of this invention.

FIG. 10 is a circuit diagram representing an embodiment of the leakage signal eliminating unit operating by analog signal processing. The constitution other than that of the leakage signal eliminating unit remains the same as that of the embodiment of FIG. 3, therefore further illustration and description will be omitted here. A counter 50 operates using the "MX3 KHz" signal from the frequency divider 21 as a clock pulse and outputs signals (for M-division of the leakage signal) in sequence to its output terminals 0, 1, 2, ... (M−1). An averaging memory 52 is constituted of an field effect transistor FET 1 and an FET 2 for ON/OFF operations, a resistance R and a capacitor C for averaging, and an amplifier 53 outputting the voltage of the capacitor C. The averaging memory 52 operates to average signals from the mixer 25 when FET 1 is on, and when it is off, it is retained (storage). When FET 2 is on, an averaged output signal is output. A holding control circuit 51 operates to supply an output signal from the counter 50 to FET 1 according to the EW signal from the processing control circuit 31 or to keep FET 1 off regardless of the counter 50.

A number of averaging memories 52 is provided corresponding to the division number M of the cycle of the leakage signal, they execute averaging operations according to the signal from the output terminals 0, 1, 2, ... (M−1) of the counter 50 and thus output the averaged outputs. When an averaging memory 52 is put into the memory status by the signal EW from the processing control circuit 31, it holds the signals averaged so far and outputs them in accordance with the counter 50. Namely, the measured result of the leakage signal is output. Next, the measured result of the leakage signal is subtracted from the signal during the distance measurement by the differential amplifier 38, which is similar to the operation in the above mentioned embodiments. Thus, in FIG. 10, the leakage signal measuring section is constituted of the counter 50, the holding control circuit 51, and M averaging memories 52 according to the division number M; the correcting section is constituted of the differential amplifier 38.

When the chopper 5 is in the external distance-measuring domain 14, it is possible that there is still a leakage optical path (not illustrated) through which a modulated optical wave from the light-emitting element 3 is reflected from the objective lens 6 and is incident on the light-receiving element 4. This leakage signal can be obtained by operating the optical distance-measuring apparatus body when it is pointed toward the sky. Namely, the distance-measuring modulated wave propagating in the distance-measuring optical path 9 is output to the air but, since there is no reflector in the air, no optical waves will return to the optical distance-measuring apparatus. Therefore, the leakage signal due to this leakage optical path can also be measured.

What is claimed is:

1. In an optical distance-measuring method wherein light from a light-emitting source radiating modulated light is directed along a normal optical path to a point, the distance to which is being measured, reflected from said point and received by a light-receiving source, and the distance to said point is measured by the phase difference between the modulated signal from the light-emitting source and a received signal from the light-receiving source, the improvement comprising the steps of:

interrupting the normal optical path from said light-emitting source to said light-receiving source, measuring a leakage signal from the light-emitting source to the light-receiving source when the normal optical path is interrupted, storing the measured result of the leakage signal, obtaining a composite signal when said normal path is not interrupted, and correcting the composite signal by the measured result of the leakage signal, thereby obtaining the distance to said point.

2. The optical distance-measuring method as defined in claim 1, wherein said leakage signal measuring step further comprises the division of a cycle of said leakage signal into M, an arbitrary number, thereby measuring its amplitude.

3. The optical distance-measuring method as defined in claim 1, wherein said leakage signal measuring step further comprises the repetition of the measurement more than once, and averaging the measured results.

4. The optical distance-measuring method as defined in claim 2, wherein said correcting step further comprises the linear approximation of the amplitude of said leakage signal between the M division points, thereby correcting said composite signal.

5. The optical distance-measuring method as defined in any of claims 1, 2 or 4, wherein said correcting step further comprises the subtraction of the measured result of said leakage signal from said composite signal, thereby obtaining a normal signal.

6. The optical distance-measuring method as defined in claim 1, wherein said correcting step further comprises the step of obtaining a phase increment $\psi_h$ due to said leakage signal, and a step of measuring the phase difference $\theta$ of the composite signal subjected to the influence of said leakage signal obtained when said normal optical path is not interrupted, and subtracting the phase increment $\psi_h$ from the phase difference $\theta$.

7. The optical distance-measuring method as defined in claim 6, wherein the phase increment $\psi_h$ can be obtained by:

$$\psi_h = y/h$$

where y is the magnitude of said leakage signal at a zero-crossing point of the composite signal when said normal optical path is not interrupted, and h is the maximum value of the amplitude of the composite signal when said normal optical path is not interrupted.

8. The optical distance-measuring method as defined in claim 6, wherein the phase increment $\psi_h$ can be obtained by:

$$\psi_h = \frac{l}{h} \sin(\psi_l - \theta)$$

where l is the maximum value of the amplitude of said leakage signal, $\psi_l$ is its phase difference, and h is the maximum value of the amplitude of the composite signal when said normal optical path is not interrupted.

9. In an optical distance-measuring apparatus constituted of a light-emitting means radiating modulated light, a light-receiving means receiving the light from the light-emitting means and reflected from the point the distance to which is being measured, and a measuring means for measuring the distance to said point from the phase difference between the modulating signal of the modulated light radiated from the light-emitting means and a received signal corresponding to the light received by the light-receiving means, the improvement comprising a normal optical path interrupting means for interrupting selectively the normal optical path from said light-emitting means to said light-receiving means, a leakage signal measuring means for measuring the leakage signal obtained when the normal optical path interrupting means has interrupted said normal optical path, a storing means for storing the measured result of the leakage signal, a composite signal measuring means for measuring the composite signal when said normal optical path interrupting means does not interrupt said normal optical path, a correcting means for correcting the composite signal according to the measured result of the leakage signal.

10. The optical distance-measuring apparatus as defined in claim 9, wherein said leakage signal measuring means further comprises means for dividing a cycle of said leakage signal by M, an arbitrary division number, and means for measuring the amplitude of said leakage signal.

11. The optical distance-measuring apparatus as defined in claim 9, wherein said leakage signal measuring means has an averaging means for averaging the results obtained through measurements carried out more than once.

12. The optical distance-measuring apparatus as defined in claim 10, wherein said correcting means further comprises means for linearly approximating the amplitude of said leakage signal between the division points, to correct said composite signal.

13. The optical distance-measuring apparatus as defined in any of claims 9, 10 or 12, wherein said correcting means has a subtracting means for subtracting the measured result of said leakage signal from said composite signal, thereby obtaining a normal signal.

14. The optical distance-measuring apparatus as defined in claim 9, wherein said correcting means further comprises a means for obtaining the phase increment $\psi_h$ due to said leakage signal, a means for obtaining the phase difference $\theta$ of the composite signal subjected to the influence of said leakage signal, obtained when said normal optical path is not interrupted, and a subtracting means for subtracting the phase increment $\psi_h$ from the phase difference $\theta$.

15. The optical distance-measuring apparatus as defined in claim 14, wherein said correcting means has a phase increment calculating means for obtaining the phase increment $\psi_h$ due to said leakage signal by:

$$\psi_h = -y/h$$

where y is the magnitude of said leakage signal at a zero-crossing point of the composite signal when said normal optical path is not interrupted, and h, is the maximum value of the amplitude of the composite signal when said normal optical path is not interrupted.

16. The optical distance-measuring apparatus as defined in claim 14, wherein said correcting means has a phase increment calculating means for obtaining the phase increment $\psi_h$ due to said leakage signal by:

$$\psi_h = \frac{l}{h} \sin(\psi_l - \theta)$$

where l is the maximum value of the amplitude of said leakage signal, $\psi_l$ is its phase difference, and h is the maximum value of the amplitude of the composite signal when said normal optical path is not interrupted.

* * * * *